(No Model.)
P. A. PALMER.
Means for Treating Teeth.
No. 237,043.          Patented Jan. 25, 1881.
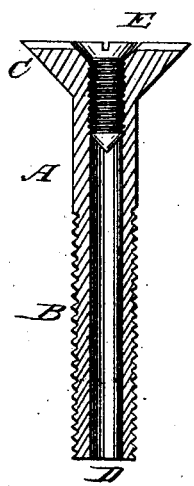
WITNESSES:
Francis McArdle.
C. Sedgwick
INVENTOR:
P. A. Palmer
BY Munn & Co.
ATTORNEYS.

UNITED STATES PATENT OFFICE.

PHILIP A. PALMER, OF CHICAGO, ILLINOIS, ASSIGNOR TO HIMSELF AND J. NORTON CHILSON, OF SAME PLACE.

MEANS FOR TREATING TEETH.

SPECIFICATION forming part of Letters Patent No. 237,043, dated January 25, 1881.

Application filed May 20, 1880. (No model.)

*To all whom it may concern:*

Be it known that I, PHILIP A. PALMER, of Chicago, Cook county, Illinois, have invented a new and Improved Means for Treating Teeth, of which the following is a specification.

My invention consists in a means for treating teeth, by which work done upon a tooth or teeth is preserved, air and moisture are excluded from the interior of the tooth, and by the means employed ready access to the pulp-cavity of the tooth may be had for the purpose of treating its interior surgically or medicinally without disturbing work previously done, all as hereinafter more fully described in connection with the accompanying drawing, which represents a preferred form of the devices used.

A is a screw, the same being the pivot-screw for an artificial crown, having upon its lower portion an exterior screw-thread, B, for holding the pivot firmly in the tooth, and at its upper end a head, C. The screw A is hollow throughout its entire length, and at its upper end is interiorly screw-threaded at any desired angle, for the reception of the small screw E.

By inserting such a device into the cavity of a tooth, and as far as necessary or desirable into the root or roots thereof, ready access to the cavity may be had simply by removing the screw for the purpose of treating exposed or diseased nerves or pulps, while at other times air, moisture, and foreign substances are excluded, and a safe masticating-surface is provided, and the medicines kept from contact with the mucous membranes of the mouth.

By the use of such a device, teeth may be filled or recrowned by any one at all conversant with the art of dentistry in cases in which, without such means, filling or recrowning would be impracticable, the device preventing the filling or crown from falling out endwise or from biting out sidewise.

I do not confine myself to the exact means shown and thus far described, as the essential feature of my invention consists in furnishing the dentist with a means for preserving all work done upon a tooth, while at the same time insuring a free opening, at will, through the artificial filling or crown to apex of root; and to effect these objects various forms of hollow pivots having removable central stoppers may be used without in the least departing from the spirit of my invention.

It frequently happens that it is necessary to treat the interior of teeth which have been filled, built up, or recrowned. By the use of my invention the tooth or teeth may be treated without destroying or disturbing the work done, and weak teeth are strengthened.

Further, teeth may be filled or recrowned that could not otherwise be successfully treated.

I am aware that it is not new in dentistry to use a screw working in a hollow tube that screws into the tooth; but

What I claim as new and of my invention is—

In dentistry, the pivot-screw A, having a longitudinal cavity extending entirely through it, and a flared or flanged head, C, adapted to receive the small screw E, for the purpose of holding the artificial crown in place, and at the same time giving access to the interior of the tooth, as shown and described.

PHILIP A. PALMER.

Witnesses:
J. N. CHILSON,
WM. CHILSON.